(12) United States Patent
van Schouwen

(10) Patent No.: US 8,818,341 B2
(45) Date of Patent: Aug. 26, 2014

(54) WRISTWATCH NOTIFICATION FOR LATE TRAINS

(71) Applicant: Google Inc., Mountain View, CA (US)

(72) Inventor: Zachary Michael van Schouwen, Jackson Heights, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/749,910

(22) Filed: Jan. 25, 2013

(65) Prior Publication Data

US 2014/0213296 A1 Jul. 31, 2014

(51) Int. Cl.
*H04M 3/42* (2006.01)
*H04W 4/02* (2009.01)

(52) U.S. Cl.
CPC ........................... *H04W 4/02* (2013.01)
USPC .................. 455/414.1; 455/414.2; 455/456.1; 455/456.3; 455/456.6; 455/457; 455/404.1

(58) Field of Classification Search
CPC ................................ H04W 4/02; H04W 4/022
USPC .......... 455/414.1, 414.2, 456.1, 456.3, 456.6, 455/457, 404.1
See application file for complete search history.

(56) References Cited

U.S. PATENT DOCUMENTS

| 7,327,986 | B2 | 2/2008 | True et al. |
| 7,469,827 | B2 | 12/2008 | Katragadda et al. |
| 2006/0046732 | A1* | 3/2006 | Grossman et al. ............ 455/450 |
| 2007/0194940 | A1 | 8/2007 | Valluru |
| 2010/0211585 | A1* | 8/2010 | Ito et al. ........................ 707/758 |
| 2014/0052681 | A1* | 2/2014 | Nitz et al. ....................... 706/46 |

OTHER PUBLICATIONS

University of Minnesota, "Your Information When You Want It!," Parking and Transportation Services, pp. 1-2. Available at: http://www1.umn.edu/pts/files/Realtime_Transit_Passenger_Guide.pdf. Visited on Oct. 3, 2012.

* cited by examiner

*Primary Examiner* — Barry Taylor
(74) *Attorney, Agent, or Firm* — Shumaker & Sieffert, P.A.

(57) ABSTRACT

Transit delay can be automated and pushed directly to a mobile device of a user based on a rank of usefulness within the mobile device interface. The closest transit station to a user's current position may be determined. An implementation may receive a current status of a transit delay in respect to the nearby transit station. A notification relating to the transit delay may be displayed on a mobile device of the user based on a relative priority of the notification, relative to other notifications available to be displayed on a mobile device of the user.

18 Claims, 2 Drawing Sheets

WRISTWATCH NOTIFICATION FOR LATE TRAINS

BACKGROUND

The growing trend in large metropolitan cities across the country has been high occupancy of various forms of public transportation. Recent statistics of transit ridership boast record reports of ridership, which have been attributed to rising job growth and spiking gas prices. Public transit typically includes, but is not limited to, buses, trains, trolleys, ferries, motorcycles, pedicabs, and cable-propelled transit. Typically, these vehicles have several destinations, or stops at which the vehicle is expected to reach at an expected time of arrival. The scheduled departure and arrival time of public transit greatly increase the convenience of using public transit.

Some of the biggest issues associated with public transportation include time wasted waiting for public transit vehicles to arrive at a passenger's particular transit stop, and uncertainty as to the arrival time at the particular transit stop or at transit connections. Public transit providers often publish a schedule indicating arrival and departure times of vehicles for each line's routes and other transit delay information. However, this information may not be available to the passenger prior to the passenger's arrival at the transit location. Furthermore, this information may not be conveyed to the passenger by an automated means.

BRIEF SUMMARY

The present disclosure is directed to methods and devices for determining the closest transit station to the user's current position and displaying status information based on a rank of usefulness within the mobile device interface. An implementation may receive a position of a user and based on the location of the user, the closest station to the user's current position may be determined. The implementation may receive a current status of a transit delay in respect to the nearby transit station. A notification of the transit delay may be displayed on a mobile device of the user based on a relative priority of the notification. The priority of the notification may be determined relative to other notifications available to be displayed on a mobile device of the user.

In accordance with another aspect of the disclosed subject matter, a device may include a processor and a display. The processor may be configured to receive a position of a user and a current status of a transit delay that affects a transit station. The processor may also be configured to determine a relative priority for a notification of the transit delay relative to other notifications available to be displayed on the mobile device. The display may be configured to display the notification.

In an implementation of the disclosed subject matter, a relative priority may be based on a position and speed of the user, the location and distance of the transit station relative to the user, the current status of the transit delay, or any other related metric. A device may be a portable electronic device such as a laptop computer or small portable computer of the type that are sometimes referred to as ultraportables. The device may also be a smaller portable electronic device, which includes wristwatch devices, cell phones, tablets, mp3 devices and other handheld electronic devices.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter relates generally to notifying passengers of transit delay as they approach a public transit station. More specifically, the technology relates to conveying transit delay information to a mobile platform based on the user's proximity to the transit station. The present disclosure provides devices and methods that may resolve the above-referenced difficulties and others.

Figure 1:
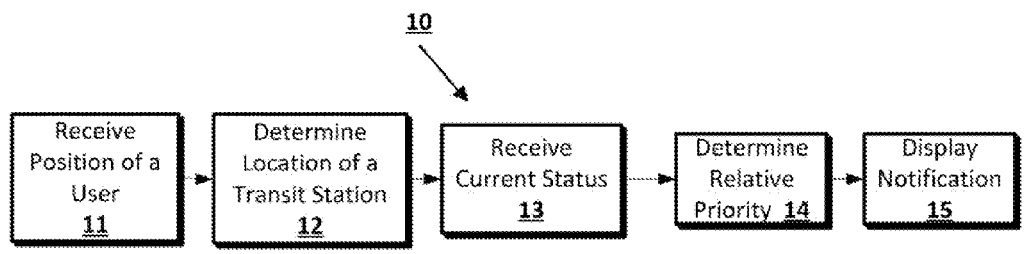
FIG. 1 is a flow chart illustrating a method in accordance with the present disclosure.

Referring now to the drawings wherein the showings are for purposes of illustrating the preferred implementation of the disclosed subject matter only and not for purposes of limiting same, FIG. 1 provides a view of the overall preferred method according to the present disclosure. FIG. 1 shows a method 10 for notifying passengers of transit delay as they approach a public transit station.

An implementation may receive a position of a user at step 11, and, at step 12, determine a location of a transit station near the user. The location of the user can be designated by the user himself (e.g., by inputting his current location into an interface) or it may be determined by the implementation. An implementation may use global positioning system, global system for mobilization localization, radio frequency identification, Wi-Fi positioning system or other related location-based services to determine the position of the user. Based on the location of the user, an implementation may also be able to determine the closest station to the user's current position. The location of the closest transit station can be designated by the user himself (e.g., by inputting the transit station's location into an interface) or it may be determined by the implementation. The location of the transit station may also be determined using global positioning system, global system for mobilization localization, radio frequency identification, Wi-Fi positioning system or other related location-based services. The location of the transit station may also be provided from a remote source. For example, the location of the closest transit station may be received from a publicly available source, a paid subscription, the carrier's website, or any other related remote sources. Once the closest transit station is designated, an implementation may determine the current status of transit delay that affect the transit station.

An implementation may receive, at 13, a current status of a transit delay in respect to the transit station. The current status may include an indication the transit is scheduled to arrive on time, the transit is scheduled to arrive later then expected, a specific line is operating on a single track, if a specific transit line is temporary shut down due to scheduled track work, or any other related indications that affect the transit station. The current status may be received from a publicly available source, a paid subscription, the carrier's website, or any other related remote sources. For example, a public transit carrier may publish: "trains single tracking between Stadium-Armory & Addison Road due to scheduled track work, expect delays through tonight's closing" on the carrier's website. An implementation may receive the current status of any transit delay in respect to the transit station. For example, if a transit station has several transit lines that pass through the station, the current status of transit delay for all of the transit lines will be received by the implementation.

The user may also personalize the transit lines for which he or she would receive current status of a transit delay. The specific transit lines of significance can be designated by the user himself (e.g., by inputting the transit station's location into an interface) or it may be determined by the implementation. For example, the user may filter notifications to only receive the transit delay of a transit line the user travels to his domicile, work, satellite office, second domicile within the city, favorite restaurant, after work gymnasium or other frequently visited destinations. In addition, an implementation may also determine that the user typically travels on a specific line. Therefore, an implementation may filter notifications to only receive the transit delay of a transit line the user typically travels.

In an implementation, other notifications available to be displayed on a mobile device may be generated by applications separate from the application generating notifications of the current status of a transit delay. An implementation may include wristwatch devices, cell phones, tablets, mp3 devices or other handheld electronic devices with limited display capabilities. As a result, an implementation may seek to minimize the quantity of notifications displayed on the mobile device to maintain its usefulness. Therefore, the implementation may allow applications to provide the user with a notification at a given priority. The most important notifications may be provided to the user at any given moment. The priority of a notification of the transit delay may be relative to other notifications available to be displayed on a mobile device of the user. Referring again to FIG. 1, an implementation may determine a relative priority for a notification of the transit delay at 14. For example, a specific numeric priority (0-100) may be determined for each notification based on relevant factors indicating when the user may want to receive the current status of transit delays. Where the notification is assigned a priority, the notification may be displayed to the user if there are no other more important notifications that demand their attention.

The relative priority may be based on a position and speed of the user, the location and distance of the transit station relative to the user, the current status of the transit delay, or the like. For example, if the user is just a few feet from a subway entrance, and moving at a walking pace, an alert is more likely to be useful than if the user is farther away or moving more quickly, which may suggest the user is in an automobile or other transport already. Furthermore, if there is a delay on a transit line that passes through the station the user is nearest, the notification may be prioritized. An implementation may seek to provide the current status of the transit delay to the user when he would most likely be interested.

In some cases, if the user's speed is determined to exceed a threshold velocity, an implementation may conclude the user is likely utilizing alternative transportation. For example, if the user is navigating a city in a car, bicycle, or any other transportation that typically travels faster then a conventional pedestrian, an implementation may determine that the user is likely not walking Therefore, an implementation may determine the user does not intend to utilize the public transit and assign a low priority for the notification.

Similarly, if the user is determined to be located a threshold distance away from the transit station, an implementation may determine a low priority for the notification. For example, if the user is several blocks away from the transit station, the implementation may determine the user's current location is too far from the transit station for the user to be interested in a transit delay. Therefore, an implementation may determine the user does not intend to utilize the public transit and assign a low priority for the notification. The implementation may also determine the transit is not experiencing a delay. In a situation where the transit is scheduled to arrive on time, the user may not need to be notified of a transit delay. Accordingly, if the transit is not experiencing a delay, the implementation may assign a low priority for the notification. Where the alert is given a low priority, the notification may be displayed to the user if there are no other important notifications that demand their attention.

Other factors used to assign a priority to a notification may include the direction the user is traveling, the time of the day or the date, whether there exist serious delays, or other relevant factors indicating when the user may want to receive current status of transit delays. For example, if the user leaves work and travels in the opposite direction of the transit station, the implementation may determine a low priority for the notification. In addition, the implementation may be made aware the user only travels on public transit during rush hours during the week. Therefore, the implementation may determine a low priority for the notification while the user is navigating near transit stations outside of rush hour. This may prevent the user from receiving the current status of transit delays when he is likely not interested in the transit delays. A notification may be given a relative priority based on one or more of these and other factors.

The implementation may display 15 the notification of the transit delay on a mobile device of the user. Based on the relative priority discussed above, the notifications may be determined to be the highest priority of notifications available to be displayed on the mobile device of the user. As a result, the notification will be displayed on a mobile device. A mobile device may include wristwatch devices, cell phones, tablets, portable media devices, or other handheld electronic devices with limited display capabilities. As a result, an implementation may seek to minimize the quantity of notifications displayed on the mobile device to maintain its usefulness. For example, because a wristwatch has a limited display, it may be desirable for the watch to display only one notification at a time.

Figure 2:
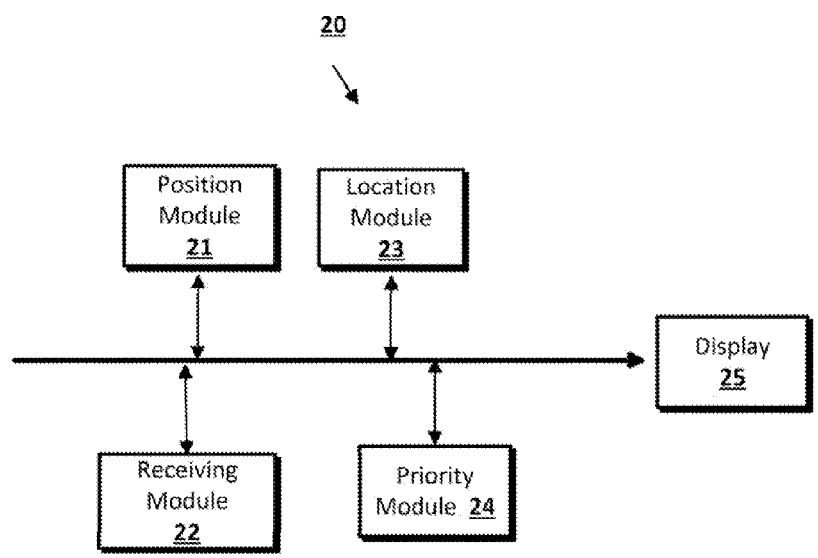
FIG. 2 is a block diagram illustrating a communications network including a system for practicing aspects of the present implementation of the disclosed subject matter.

FIG. 2 shows a system 20 for notifying passengers of transit delay as they approach a public transit station. The system 20 may include a wireless communication functionality, which may be implemented by, a position module 21 and a receiving module 22. The position module 21 may determine the position of the user as described above. Furthermore, the receiving module 22 may be configured to receive a current status of a transit delay as described above.

The system 20 may also include a location module 23, and a priority module 24. The location module 23 may determine the location of the transit station as described above. The priority module 24 may be configured to determine a relative priority for a notification of the transit delay relative to other notifications available to be displayed on the mobile device. Finally, the system 20 may include a display 25 configured to display the notification on a mobile device of the transit delay as described above.

A device may be a portable electronic device such as a laptop computer or small portable computer of the type that are sometimes referred to as ultraportables. Furthermore, the device may be a smaller portable electronic device, which includes wristwatch devices, cell phones, tablets, portable media devices and other handheld electronic devices.

While various embodiments of the present invention have been described above, it should be understood that they have been presented by way of example and not limitation. It will be apparent to one skilled in the pertinent art that various changes in form and detail can be made therein without departing from the spirit and scope of the invention.

Figure 3:
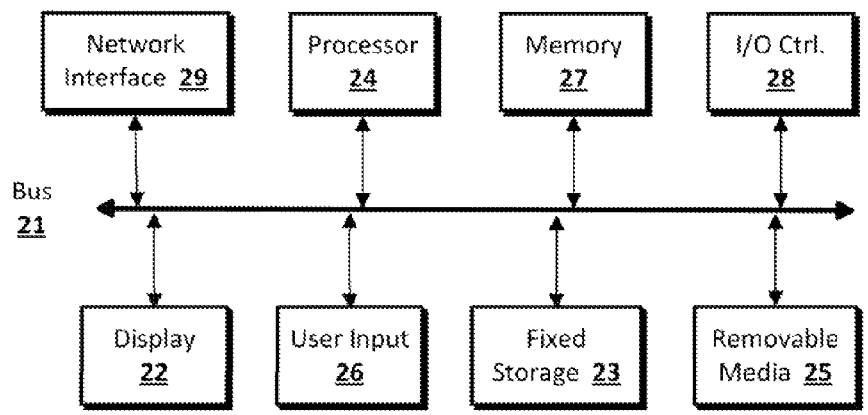
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
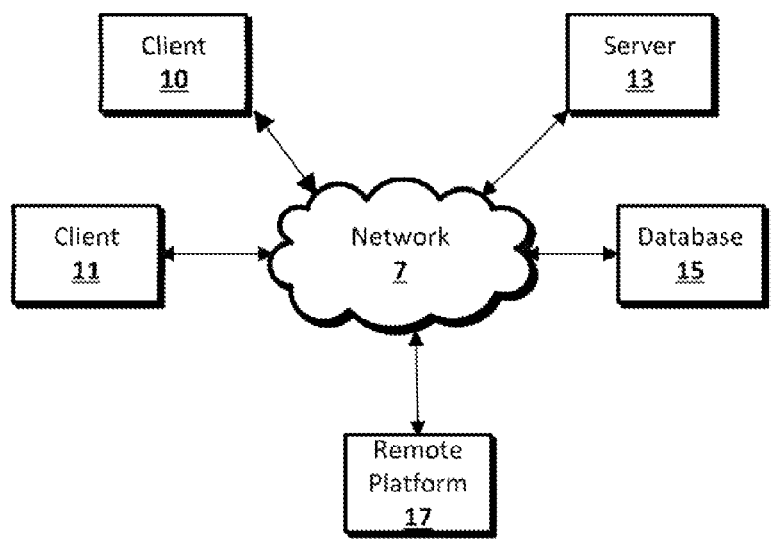
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general-purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving a location of a user associated with a mobile computing device;
determining a location of a transit station near the user;
receiving a current status of a transit delay associated with the transit station;
receiving, by the mobile computing device, a plurality of notifications that are each available to be displayed at a display device, the plurality of notifications comprising a notification based on the transit delay and one or more other notifications;
determine, based on a distance between the location of the user and the location of the transit station, a priority of the notification based on the transit delay, the priority of the notification based on the transit delay being relative to respective priorities of each of the one or more other notifications;
responsive to determining that the priority of the notification based on the transit delay indicates that the notification based on the transit delay is of greater importance than each of the one or more other notifications available to be displayed at the display device; and
while refraining from outputting, for display at the display device, any of the one or more other notifications from the plurality of notifications, outputting, by the mobile computing device, for display at the display device, the notification based on the transit delay, wherein the notification based on the transit delay comprises information indicating the current status of the transit delay at the transit station and a proximity of the location of the user to the location of the transit station.

2. The method of claim 1, wherein the transit delay associated with the transit station is associated with a transit line between the location of the transit station and a location of a domicile associated with the user.

3. The method of claim 1, wherein determining the location of the transit station near the user comprises receiving the location of the transit station from a remote source.

4. The method of claim 1, wherein receiving the current status of the transit delay comprises receiving the current status from a publicly-available source.

5. The method of claim 1, wherein the relative priority of the notification is determined further based on at least one of a speed of the user or the current status of the transit delay.

6. The method of claim 1, wherein the one or more other notifications are generated by one or more applications that are separate from an application that generates the notification based on the transit delay.

7. The method of claim 1, wherein the priority of the notification based on the transit delay exceeds the respective priorities of each of the one or more other notifications.

8. The method of claim 1, wherein the transit delay associated with the transit station is associated with a transit line on which the user has previously traveled.

9. A mobile computing device comprising:
at least one processor configured to:
receive a location of a user associated with the mobile computing device and a current status of a transit delay associated with a transit station;
receive a plurality of notifications that are each available to be displayed at a display device, the plurality of notifications comprising a notification based on the transit delay and one or more other notifications;
determine, based on a distance between the location of the user and a location of the transit station, a priority of the notification based on the transit delay, the priority of the notification based on the transit delay being relative to respective priorities of each of the one or more other notifications; and
responsive to determining that the priority of the notification based on the transit delay indicates that the notification based on the transit delay is of greater importance than each of the one or more other notifications available to be displayed at the display device; and
while refraining from outputting, for display at the display device, any of the one or more other notifications from the plurality of notifications, output, for display at the display device, the notification based on the transit delay, wherein the notification based on the transit delay comprises information indicating the current transit delay at the transit station and a proximity of the location of the user to the location of the transit station.

10. The mobile device of claim 9, wherein the transit delay associated with the transit station is associated with a transit line between the location of the transit station and a location of a domicile associated with the user.

11. The mobile device of claim 9, wherein the location of the user and the location of the transit station are each received from a remote source.

12. The mobile device of claim 9, wherein the current transit delay is received from a publicly available source.

13. The mobile device of claim 9, wherein the priority of the notification is determined further based on at least one of a speed of the user or the current transit delay.

14. The mobile device of claim 9, wherein the one or more other notifications are generated by one or more applications that are separate from an application that generates the notification based on the transit delay.

15. The mobile device of claim 9, wherein the priority of the notification based on the transit delay exceeds the respective priorities of each of the one or more other notifications.

16. The mobile device of claim 9, wherein the mobile device comprises a wristwatch.

17. The mobile device of claim 9, wherein the transit delay associated with the transit station is associated with a transit line on which the user has previously traveled.

18. The mobile device of claim 9, wherein the mobile device comprises the display device, the display device being configured to present a single notification at a time.

* * * * *